United States Patent [19]

Koskinen et al.

[11] Patent Number: 5,137,856
[45] Date of Patent: Aug. 11, 1992

[54] PROCESS FOR THE PREPARATION OF A SUPPORTED POLYMERIZATION CATALYST

[75] Inventors: Jukka Koskinen, Espoo; Eero Iiskola; Pekka Sormunen, both of Porvoo, all of Finland

[73] Assignee: Neste Oy, Kulloo, Finland

[21] Appl. No.: 327,032

[22] Filed: Mar. 22, 1989

[30] Foreign Application Priority Data

Mar. 31, 1988 [FI] Finland .................... 881538

[51] Int. Cl.$^5$ ............................ C08F 4/654
[52] U.S. Cl. .................... 502/107; 502/104; 502/108; 502/126; 422/226
[58] Field of Search ............ 502/104, 107, 108, 126

[56] References Cited

U.S. PATENT DOCUMENTS

| | | | |
|---|---|---|---|
| 3,966,420 | 6/1976 | Pegels et al. ................ | 23/288 |
| 4,325,837 | 4/1982 | Capshew et al. ............ | 502/108 |
| 4,326,988 | 4/1982 | Welch et al. ............... | 502/108 X |
| 4,508,844 | 4/1985 | Agapiou ..................... | 502/108 |
| 4,536,484 | 8/1985 | Lacombe et al. ........... | 502/108 X |

FOREIGN PATENT DOCUMENTS 1525693  9/1978  United Kingdom ........... 502/104

Primary Examiner—Patrick P. Garvin
Attorney, Agent, or Firm—Banner, Birch, McKie & Beckett

[57] ABSTRACT

The invention relates to a method for the preparation of a supported polymerization catalyst in a multi-function reactor (1) which is equipped with a mixer (2) and at the bottom of which there is fitted a downward substantially conically converging sieve tray (3), possibly detachable, and in which there are carried out, as required for the preparation of the catalyst, an activation stage, i.e. the treatment of the catalyst support with a transition metal compound, washing stages using a suitable solvent, and drying stages using an inert gas, and possibly a prepolymerization of a suitable monomer by means of the obtained activated catalyst and a cocatalyst and possible other compounds, for example a polymerization medium.

6 Claims, 1 Drawing Sheet

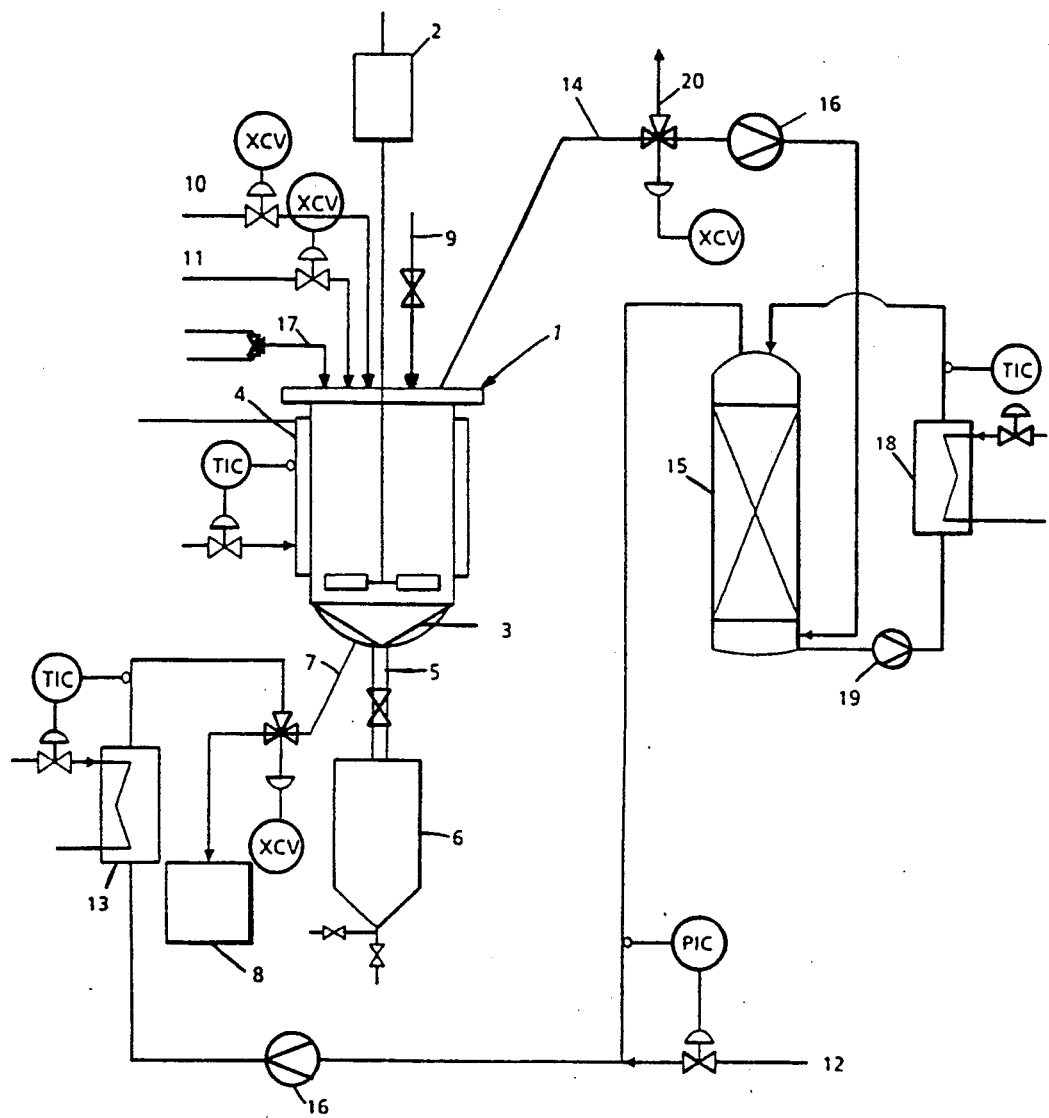

PROCESS FOR THE PREPARATION OF A SUPPORTED POLYMERIZATION CATALYST

FIELD OF THE INVENTION

The invention relates to a process for the preparation of a supported polymerization catalyst, the process including activation, washing, drying and prepolymerization stages, and to an apparatus for carrying out the process.

BACKGROUND OF THE TECHNOLOGY

The polymerization of monomers, especially olefins, can be carried out at a low pressure by using transition metal based catalysts, for example of the Ziegler-Natta type, which are catalyst compositions made up of a transition metal compound, an organometallic compound, and possibly other components. Ziegler-Natta type supported catalysts are prepared through the deposition of one or more transition metal compounds on a possibly pre-treated support, and the reduction of the thereby obtained compound by an organometallic compound which acts as a co-catalyst. The heterogenous catalysts thereby obtained are superactive, i.e. their activity is up to 20–100 times greater than the activity of unsupported catalysts.

The deposition of a transition metal compound on the support surface is carried out between a support in a solid phase and a transition metal compound usually in a liquid phase or in a liquid state. This stage of catalyst preparation thus involves operations for feeding the initial substances into the reactor and for creating in it suitable reaction conditions, for separating the unreacted liquid from the product, and for washing and drying the product.

The support on which the transition metal compound has been deposited is usable as a dry powder for olefin polymerization, in which case the reduction by an organometallic compound is carried out either before or at the beginning of the polymerization operation. On the other hand, the drying stage can be omitted and the reduction and the polymerization can be carried out immediately after the deposition on the support. The last-mentioned process is advantageous, for example, when an after-treatment is carried out on the supported catalyst by prepolymerizing a suitable monomer on its surface in order to improve its stability and its physical properties.

The above preparation stages are in general carried out in separate units, and thus the products have to be transferred from one unit to another during the preparation. Since both the reaction components and the reactions are highly sensitive to impurities, such transfer operations may cause weakening and unevenness of the catalyst quality. In addition, the various successive activation and washing operations require that the formed solid precipitate settles on the bottom of the tank, in which case the mixing must be discontinued and the liquid on top of the precipitate must be removed by siphoning. Such an operation leaves a large amount of activation or washing solution in the precipitate, and consequently its separation and washing efficiency is low and requires very many washing rounds in order to achieve the desired degree of purity. Thus, unreasonable amounts of time and washing chemicals are spent in the present-day operations and, furthermore, during the siphoning stage a proportion of the usable solids is lost together with the liquid which is removed.

The drying stage may be rather problematic, since the polymerization catalyst, which is sensitive to the effects of the oxygen and humidity of air, may be destroyed when the protecting liquid layer is removed, unless the operation is carried out in a highly inert, dry and oxygen-free atmosphere. When mechanical dryers are used, there is the risk that the fragile catalyst particles will break, and in vacuum drying unnoticeable air leaks are easily produced which will destroy the catalyst.

SUMMARY OF THE INVENTION

The purpose of the present invention is to provide a process and apparatus by means of which the above-mentioned disadvantages can be eliminated. The invention is thus mainly characterized by what is stated in the characterizing clause of the claims. It has thus now been discovered that the various stages of preparing a supported polymerization catalyst can be carried out in the same reactor, when the reactor is a tank provided with a mixer and having at its bottom a substantially conically converging sieve net which lets through the liquid solutions separated from the catalyst and the solid particles too finely divided in terms of the functioning of the catalyst. On the other hand, the particles of the completed catalyst are left on the sieve net and thenflow along the slanted net into the completed-catalyst outlet at the lower end of the net and in the bottom of the reactor.

The stage of preparing a supported polymerization catalyst involves operations for feeding the initial substances into the reactor and for creating in it suitable reaction conditions, for separating the unreacted material from the product, and for washing and drying the product.

First the support in the form of solid particles is caused to react with the active catalyst component present in a liquid phase. This stage can, when necessary, be repeated several times. The support may be any inorganic or organic, chemically inert or reactive support. The invention is particularly usable for the preparation of isospecific supported catalysts for $\alpha$-olefin polymerization. An example of a suitable support in this case is $MgCl_2$ which has been prepared or pre-treated, for example, by grinding and/or by means of chemicals so that it has a stereospecifically advantageous morphology and specific surface area.

The active catalyst component to be deposited on the support may be any transition metal compound used in the art. $TiCl_4$ is especially suitable for the preparation of a catalyst according to the invention.

Since the active catalyst component which reacts with the support is usually highly sensitive to moisture and oxygen present in air, the reaction with the support must be carried out in a completely water-free and oxygen-free inertgas atmosphere, for example a nitrogen atmosphere. In this case the process according to the invention involves the rinsing of the multi-function reactor and its contents with the said inert gas, and the effective maintaining of an inert-gas atmosphere in the reactor. It is advantageous to maintain the gas system at an overpressure so that the access of air into the reactor is prevented.

Effective mixing is required in the reactor to produce the high transfer of matter necessary for the activation and washing. A turbine-type mixer has been found to be best for this purpose. In addition, the mixing may be promoted by means of, for example, flow baffles.

The product, in the form of solid particles, of the reaction between the support and the active catalyst component is thereafter separated from the remaining liquid. This is carried out by discontinuing the mixing or by adjusting it so as to be suitable for the emptying of the reactor. Then the solid product begins to settle on the net under its own gravity and/or under the effect of the discharge of the liquid. The settling of the solid on the net as an even cake which is advantageous for drying and of a more or less even thickness and quality, can advantageously be promoted by flow baffles. According to the invention, the sieve net which converges substantially conically downwards is located at the bottom of the reactor, preferably so that, together with the reactor bottom and the lower section of the reactor wall, it defines a space into which both the liquid separated from the catalyst and the finely-divided solids flow when the waste solution outlet in the bottom of the said space is opened. Since the said active catalyst component is usually a liquid (e.g. TiCl$_4$), dissolved in a liquid or soluble in the washing solvent, it can pass through the sieve net and discharge through the reactor bottom, whereas the support activated by the said catalyst component remains in the form of particles on the sieve net. Such filtering on a net sieve separates the solid and the liquid much more effectively than, for example, siphoning.

The washing of the support which has been activated with a catalyst component is usually repeated several times; the washing is in general of great importance for the separation of physisorbed reaction products and impurities. In this case the washing liquid is first mixed with the reaction product and is thereafter separated from it by filtering by means of the sieve net of the multi-function reactor according to the invention. Thereby the material which is too finely-divided is removed in addition to the liquid impurities. Preferably, the washing solvent comprises an aliphatic hydrocarbon.

The efficiency of the washing stage of the multi-function reactor can be assessed with the help of the following formula (1), which applies to the operation of an ideal batch washer:

$$\frac{c_n}{c_o} = \left(\frac{L_j}{L_o}\right)^n \quad (1)$$

where
- $c_n$ = the concentration of the material to be washed out, after n washes, g/l,
- $c_o$ = the initial concentration of the material to be washed out, g/l,
- $L_j$ = the washing solvent residue in the catalyst precipitate after the filtration, liters of washing solution/kg of dry catalyst, and
- $L_o$ = the rate of washing solvent in the reactor during the wash, liters of washing liquid/kg of dry catalyst.

Next, the washed reaction product is dried with the aid of a gas flow, possibly heated. When the multi-function reactor according to the invention is acting as a dryer, the inert gas such as nitrogen is preferably cycled via the washing solvent removing device, such as an absorption column which condenses the solvent, and then returns to the reactor, possibly having first been heated. Thus the consumption of the gas is minimized, and since the drying gas does not contain oxygen or other catalyst poisons, the quality of the catalyst remains high. Since the drying gas is preferably fed into the reactor from below so that it rises through the sieve net and suspends the wet reaction product, the drying is especially effective. Since, furthermore, the gas system is maintained at an overpressure, the access of air into the reactor is prevented. In order for the drying to take place evenly and simultaneously throughout the product, the flow of the drying gas can be promoted by guiding it by means of baffles. The drying of the catalyst by means of an inert gas is also gentle, and no breaking of the catalyst particles occurs.

Finally the washed and dried reaction product is removed from the sieve net of the reactor. The particles of the reaction product flow along the slanted net to the lower end of the cone, which opens into the product outlet pipe in the bottom of the reactor. The flow can be promoted, for example by means of a mechanical vibrator.

The dried product of the reaction between the support and the catalyst component is used for the polymerization of various monomers such as olefins, in which case the reduction by the organometallic compound which acts as a cocatalyst is carried out before the polymerization. The drying stage may also be omitted, and the reduction which belongs to the preparation of the Ziegler-Natta catalyst can be carried out directly after the deposition of the support and the washing of the deposition product. In the reduction reaction the product of the reaction between the support and the active catalyst component is reacted with the co-catalyst, which is in general a trialkyl aluminum compound or some alkyl aluminum halide. The co-catalyst is in general in a liquid state or in a solution, and so the same reaction, separation, washing and drying steps can be used for the reduction reaction as were used in the reaction of the support and the active catalyst component.

As the result of the reduction, a finished Ziegler-Natta type supported polymerization catalyst is produced, which is usable as such. In addition, a suitable monomer can be prepolymerized in a suitable medium by means of the obtained transition metal compound and co-catalyst and possible other catalyst components (e.g. electron donors) on the support, with the purpose of preparing a catalyst which is less susceptible to contamination during subsequent handling and storage. Since the prepolymerization usually also involves reaction, separation, washing and drying stages, the multi-function reactor according to the invention is especially suitable for prepolymerization which coats the surface of catalyst particles, whereby the otherwise very long and complicated prepolymerization procedure is simplified, facilitated and speeded up. Furthermore, prepolymerization in a multi-function reactor such as this provides a better possibility for reaching the desired end result, since the various stages are easy to control with precision.

The reactor according to the present invention is thus a multi-function reactor in which it is possible to carry out all or a substantial proportion of the activation, washing, drying and prepolymerization stages required in the preparation of, for example, a Ziegler-Natta type supported catalyst. Such a method and reactor can, of course, also be used for the preparation of catalysts of other types and other compounds which require similar treatment stages. In a multi-function reactor of this type the various stages are carried out as successive batch operations, but so that all of the stages within the protective scope of the invention need not be carried out, and so that the order of the stages can also be varied as desired. The process can be operated by automatic control according to the desired production program. Thereby the process and apparatus according to the invention function effectively in the various stages, and the process operations are facilitated and simplified. The quality of the catalyst will be uniform and the risks of its breaking and being contaminated are insignificant.

BRIEF DESCRIPTION OF THE DRAWING

The figure depicts a schematic representation of a multifunction reactor according to one embodiment of the present invention, with its feeding, control, mixing, outlet, regeneration and after-treatment devices.

The multi-function reactor 1 comprises a tank provided with a mixer 2, the tank having a liquid-circulation mantle 4 in order to bring it to the desired temperature and a sieve net 3 which converges conically downwards and may be a separate, rapidly replaceable filter basket. The open lower end of the sieve net which converges downwards communicates, via a connection 5 provided with a valve, with the container 6 for the supported catalyst product. The sieve net 3 is, when necessary, provided with a mechanical vibrator which promotes the downward flow of the catalyst; however, the vibrator is not indicated in the figure. The tank of the multi-function reactor 1 is furthermore equipped with a pipe 7, provided with a valve, designed for the removal of the treatment and washing solutions, the pipe 7 leading to the waste liquid container 8. At the upper end of the tank of the multi-function reactor 1 there is a feed pipe 9 for the catalyst support, a feed pipe 10 for a liquid reactant such as the catalyst component reacting with the support, and a feed pipe 11 for the washing solvent. If a prepolymerization stage is used, the upper end of the tank also has a feed pipe 17 for feeding into the multi-function reactor a co-catalyst, a monomer, and possibly other substances. In addition, the upper end of the tank of the multi-function reactor 1 has a gas outlet pipe 14, which leads to a lye absorber 20. The catalyst shield gas and drying gas devices comprise a gas feed pipe 12, a gas preheater 13, and a pipe for feeding gas into the reactor, which pipe in the embodiment depicted in the figure is the same as the pipe 7 designed for the removal of the treatment and washing solutions. The gas outlet pipe 14 leads from the lye absorber 20 to an absorption column 15, in which the washing solvent present in the circulating gas is absorbed into the cold washing solvent, whereafter it, together with possible fresh gas feed, is recycled to the preheating. The washing solvent is cooled in a heat exchanger 18 and circulated by means of a pump 19. The circulation in the gas system is effected by means of one or several blowers 16. The symbol TIC indicates temperature control, PIC indicates pressure control, and XCV indicates a programmed automatic open/close valve.

The operation of the multi-function reactor is described in greater detail with the aid of the following examples, but it is to be noted that the reactor can also be used for the treatment of compounds of other types.

Examples 1 and 2 describe the activation, washing and drying stages of a polymerization catalyst prepared by the spray-crystallization process described in Patent Application FI 862459.

EXAMPLE 1

2000 g of a catalyst support was batched under nitrogen pressure into the multi-function reactor 1 through the pipe 9 of the multi-function reactor system depicted in the figure, and the mixer 2 having a rotational velocity of 200 rpm was started. 30 l of $TiCl_4$ at $-10°$ C. was added through the pipe 10, and the mixture was heated slowly to 100° C., at which temperature the mixture was maintained for 2 h. The hot titanium chloride solution was filtered through a sieve net (Multipor 15 μm, manufacturer Filtertechnik AG) via the pipe 7 into the waste tank 8. The reactor was re-batched with 30 l of $TiCl_4$ at room temperature, the temperature was raised to 100° C., which temperature was maintained for 2 hours.

The gases generated in the reactor were directed through the pipe 14 via a three-way valve to the lye absorber 20. Thereafter the valve to the pipe 7 was opened and the $TiCl_4$ liquid was filtered through the sieve net, and the valve leading to the pipe 7 was closed. Thereafter 50 l ($L_o$ in Formula 1) of an aromatics-free hydrocarbon solvent (LIAV 110, boiling range 80°–100° C., Neste Oy), heated to almost 80° C. without boiling, was fed into the reactor, and the mixer (200 rpm) was started, and the suspension was mixed for 30 min at 100° C.

The batch washing and filtration described above was repeated a total of six times. The measured washing solvent residue in the catalyst precipitate was 0.7 l ($=L_j$ in Formula 1).

The washing efficiency was observed by taking a 100 ml sample from each washing filtrate in the pipe leading to the product container and by determining the Ti and Cl concentrations in the samples. These analysis results are shown in Table 1; it can be concluded on the basis of the results that three washing rounds suffice to wash the catalyst clean of the physisorbed $TiCl_4$ which is detrimental to catalyst action in α-olefin polymerization.

TABLE 1

| | Purity of the washing filtrate | |
|---|---|---|
| Washing solution No. | Ti concentration mg/kg of washing solution | Cl concentration mg/kg of washing solution |
| 1 | 17000 | 52000 |
| 2 | 800 | 2700 |
| 3 | 97 | 200 |
| 4 | 35 | 100 |
| 5 | <10 | <100 |

EXAMPLE 2

The activated catalyst obtained in Example 1 remained as a damp, even cake on top of the filter net. Warm nitrogen gas at 60° C. was fed through this sieve net from below, via the pipe 7, at a flow rate of 100 l/min and at a pressure of 1.25 bar. After three hours' drying the catalyst had dried into a loose and running powder. The feeding in of gas was discontinued and the catalyst was allowed to flow under gravity into the nitrogenized product tank 6. The catalyst quantity was 1.83 g and its Ti content after drying was 4.1 % by weight and its remanent moisture content 10 % by weight hydrocarbon solvent.

EXAMPLE 3

The catalyst may also be prepolymerized in the multifunction reactor. In this example the prepolymerization was carried out otherwise as described in Patent Application FI 873129. Until the drying stage the procedure was as above in Example 1, but thereafter the catalyst was not dried but the procedure after the activation stage was as follows:

The last catalyst-washing solution was filtered out and directed into the waste tank 8 through the pipe 7.

Meanwhile, the following solution had been prepared in a separate tank:

40 l of n-pentane dried on molecular sieves was added to 1988 ml of tri-isobutyl aluminum (100 % TIBA, Schering AG) and 986 ml of 1,8-cineole also dried on molecular sieves. The molar proportion Al/cineole was thus 1.25.

This cocatalyst/prepolymerization solution obtained was mixed at room temperature for 15 min and was thereafter fed through the pipe 17 into the multi-function reactor, in which the catalyst and the cocatalyst/prepolymerization solution were mixed together for 15 min. Next, 3000 ml (2.0 kg) of 4-methyl-1-pentene was added along the pipe 17, and the solution was mixed at room temperature for 30 min. In the prepolymerization the molar proportion Al/Ti was 5.

The prepolymerization was terminated by filtering the solution through the pipe 7 into the waste tank. The prepolymerized catalyst was washed twice by batching 40 l of n-pentane into the multi-function reactor, in which the solution was then mixed for 15 min.

A further 20 l of n-pentane was added into the reactor and, while the mixer was rotating, the catalyst slurry was allowed to flow into the product tank.

We claim:

1. A process for the preparation of a supported catalyst for α-olefin polymerization in a single multifunctional reactor, said process occurring in the same reactor with an oxygen-free and water-free atmosphere and including the steps of:

contacting a solid particulate mgCl$_2$ support with a catalystic transition metal compound in a liquid phase under an atmostpher of inert gas in said multifunctional reactor;

mixing said MgCl$_2$ support with said catalytic transition metal compound component in said reactor to form supported catalyst solids;

collecting the supported catalyst solids on a conically-shaped sieve disposed with the sieve apex toward the bottom of said reactor;

collecting washed catalyst solids on a conically-shaped sieve disposed in the bottom of said reactor;

drying the washed catalytic solids in said reactor by passing a stream of inert gas upwardly through the catalyst solids collected on said conically-shaped sieve; and removing said catalytic solids by passing said catalytic solids through the apex of said sieve and out of said reactor.

2. The process of claim 1 wherein the drying step comprises drying said catalyst solids with a heated stream of inert gas free of oxygen and water.

3. The process of claim 1 wherein the contacting step comprises contacting particulates comprising said magnesium chloride with a liquid solution comprising titanium tetrachloride as said catalytic transition metal compound.

4. The process of claim 3 wherein the contacting step is at a temperature of about −10° C. and the drying step is at a temperature of 60°–100° C. with nitrogen.

5. The process of claim 1 further comprising the step of:

prepolymerizing the washed catalytic solids before the drying step by contacting the washed catalytic solids with a cocatalyst/prepolymerization solution comprising an α-olefin momomer, n-pentane, tri-isobutyl aluminum, and 1,8-cineole.

6. The process of claim 1 wherein the step of collecting washed catalyst solids further comprises:

separating from said washing liquid and finely divided solids from said supported catalyst solids; and wherein the drying step comprises:

passing said drying gas upwardly through said sieve and suspending catalyst solids retained on said sieve in the rising stream of drying gas.

* * * * *